(12) United States Patent
Weinand

(10) Patent No.: US 7,323,059 B2
(45) Date of Patent: Jan. 29, 2008

(54) PLANT FOR THE TREATMENT, IN PARTICULAR THE CATAPHORETIC DIP COATING OF OBJECTS, IN PARTICULAR OF VEHICLE CHASSIS

(75) Inventor: Hans-Joachim Weinand, Ditzingen (DE)

(73) Assignee: Eisenmann Maschinenbau KG (Koplementar: Eisenmann-Stifftung), Boeblingen (DE)

( * ) Notice: Subject to any disclaimer, the term of this patent is extended or adjusted under 35 U.S.C. 154(b) by 332 days.

(21) Appl. No.: 10/507,090

(22) PCT Filed: Feb. 1, 2003

(86) PCT No.: PCT/EP03/01006

§ 371 (c)(1), (2), (4) Date: Aug. 16, 2005

(87) PCT Pub. No.: WO03/076696

PCT Pub. Date: Sep. 18, 2003

(65) Prior Publication Data

US 2006/0037535 A1    Feb. 23, 2006

(30) Foreign Application Priority Data

Mar. 13, 2002 (DE) ................................ 102 11 214

(51) Int. Cl.
*B05C 3/00* (2006.01)

(52) U.S. Cl. ........................................ 118/423; 118/503

(58) Field of Classification Search ................ 118/423, 118/324, 500, 416, 52, 503; 427/435, 425; 198/346.3, 346, 817, 375, 377.02
See application file for complete search history.

(56) References Cited

U.S. PATENT DOCUMENTS 6,165,283 A   12/2000  Dahlin et al.
6,173,810 B1  1/2001   Citron et al.

FOREIGN PATENT DOCUMENTS

DE  19957607 A1  5/2001
DE  20105676 U1  6/2001

*Primary Examiner*—Brenda A. Lamb
(74) *Attorney, Agent, or Firm*—Factor & Lake, Ltd.

(57) ABSTRACT

The invention relates to a plant for the treatment, in particular the cataphoretic dip coating of objects, in particular of vehicle chassis (4), whereby the objects (4) are run by means of a transport car (5) through several treatment stations and on so doing are dipped in at last one treatment container (91) and retrieved therefrom again. The transport car (5) comprises a chassis (7, 8, 9 to 12), which travels along the trajectory of the objects (4), at least one pivot arm (50, 51), connected to the chassis (7, 8, 9 to 12), a mounting (61) joined to the pivot arm (50, 51), for at least one object (4) and independently operated drives (32, 33, 56, 57, 80, 81) for the translational displacement and the pivoting displacement of the at least one pivot arm (50, 51) and the mounting (61). The transport car (5) can be used not only for transport of the objects (4) for treatment but can also have a service basket (90) fixed thereto, suitable for the accommodation of at least one operative. The service basket (90) can be brought into any position which can be reached by the pivot arm (51), by means of the transport car, whereby the alignment of the service basket (90) in maintained permanently in the vertical by means of a special device (92). The operative in the service basket (90) can carry out maintenance and cleaning work on all reachable objects and surfaces in a convenient manner.

11 Claims, 9 Drawing Sheets

Figure 1:
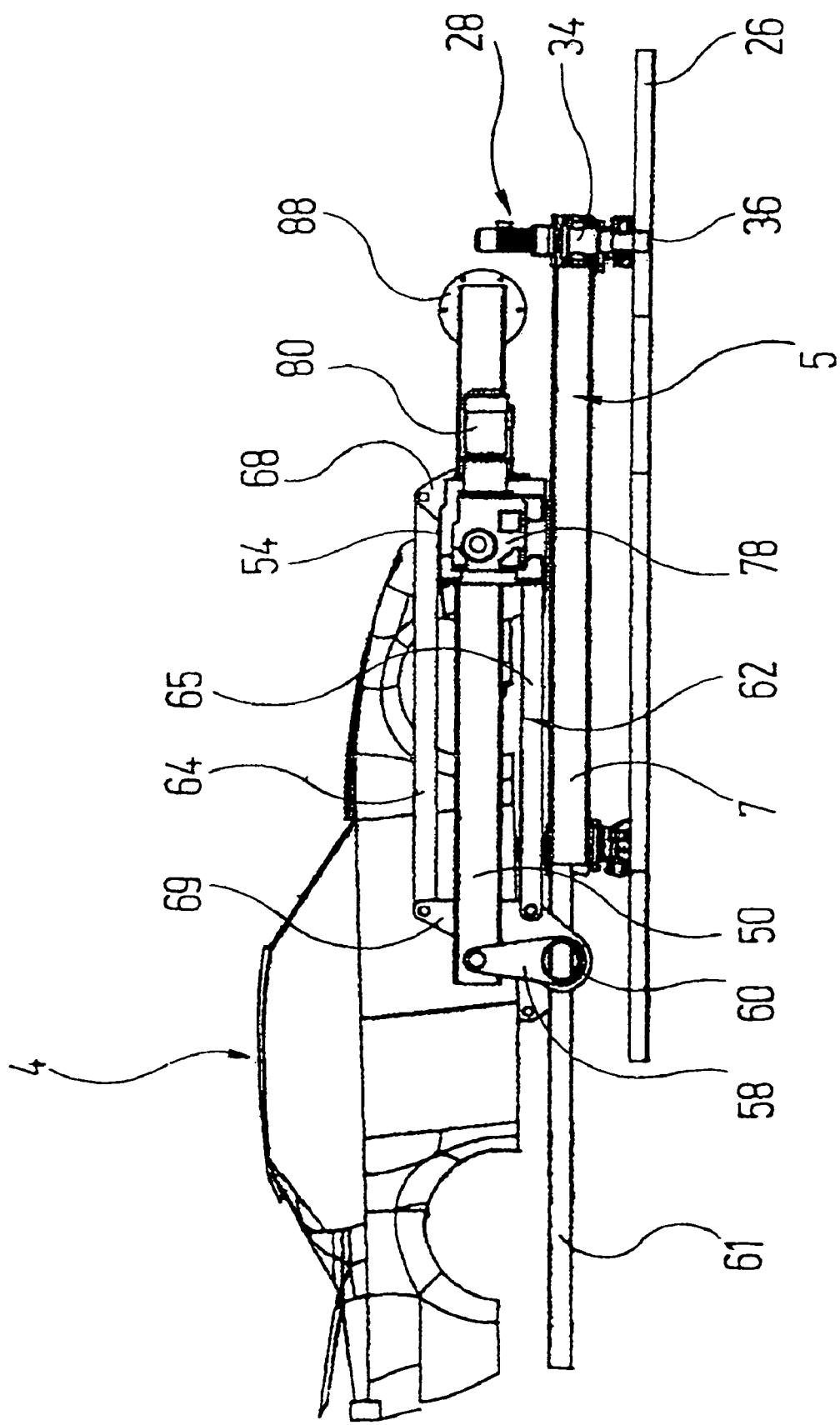

PLANT FOR THE TREATMENT, IN PARTICULAR THE CATAPHORETIC DIP COATING OF OBJECTS, IN PARTICULAR OF VEHICLE CHASSIS

The invention relates to a system for treating, in particular for cataphoretically dip-coating, articles, in particular vehicle bodies, comprising
  a) a plurality of treatment stations, of which at least one comprises a treatment container and at which the articles undergo a treatment;
  b) a feed device, by means of which the articles are conveyed through the various treatment stations and in the process are introduced into and removed from the at least one treatment container.

The coating of articles and, in particular, the coating of vehicle bodies is a complex process that comprises a multitude of treatment operations. Besides the actual coating operation, these treatment operations in particular also include pre-treatment processes, in which the articles are prepared. These are, in particular, cleaning processes but also physico-chemical preparation processes such as phosphatizing, passivation, activation plus the associated rinsing operations. All of these treatments take place in each case at treatment stations, in particular also in treatment containers, through which the articles to be treated are moved with the aid of a feed device.

In the course of operation of the system the treatment stations and the equipment adjacent to them become dirty and have to be cleaned. This applies particularly to treatment containers, in which the articles are acted upon by a liquid and in which sludge deposits often form. Previously, at specific intervals cleaning personnel had to climb into the treatment containers and manually remove the sludge, this being an extraordinarily costly and laborious task.

The object of the present invention is to develop a system of the initially described type in such a way that cleaning and maintenance work may be carried out more easily.

This object is achieved according to the invention in that
  c) the feed device comprises at least one feed carriage, which in turn comprises:
    ca) running gear movable along the path of motion of the articles;
    cb) at least one swivel arm coupled to the running gear;
    cc) a holding device coupled to the swivel arm for at least one article;
    cd) mutually independently actuable drives for the translational movement, the swivelling motion of the at least one swivel arm and of the holding device;
  d) a service cage for carrying at least one person is fastenable to the holding device;
  e) a device is provided, by means of which the service cage upon a swivelling motion of the swivelling arm is kept in vertical alignment.

According to the invention, as a feed device, use is made of a feed carriage of the type that is known as such from DE-U-201 05 676. There, however, this feed carriage is used merely for the immersion and removal of an article into and out of a treatment bath. With the present invention it is recognized that the kinematics, which the known feed carriage provides for the articles fed thereby, may also serve another purpose; when, namely, a service cage for attendance personnel is fastened to the holding device that normally carries the articles to be treated, this service cage may then be moved to any desired point within the system where cleaning or maintenance is required. It is merely necessary to ensure that upon the swivelling motion of the swivel arm the holding device carrying the service cage remains horizontal and/or, this being synonymous therewith, the service cage as a whole always remains vertically aligned.

Thus, when cleaning or maintenance work is required in the system, in particular in the treatment containers, the attendance personnel may be brought with the aid of the feed carriage directly to the points where the maintenance work is to be carried out. This work is therefore quite considerably facilitated. The conveying of sludge or the like out of treatment containers may also be effected with the assistance of the feed carriage very much more easily than was the case in the background art.

Theoretically, it is perfectly possible for the independent drives for the swivel arm and for the holding device, on which the service cage is situated, to be electronically controlled in such a way that the service cage always maintains the desired vertical alignment. For safety reasons, however, developments are preferred, in which the drive connection between the holding device and the independent drive for the holding device is disconnectable. The effect achieved thereby is that the holding device and hence the service cage may swivel freely about the axis that connects the service cage to the outer end of the swivel arm. It may then be ensured by suitable measures in a non-electronic manner that the holding device, upon swivelling of the swivel arm, is always held in such a way that it maintains its vertical alignment.

For example, for this purpose a mechanical guide device may be provided.

A first embodiment of such a guide device is notable for the fact that it comprises:
  a) a rigidly fastened, horizontally extending guide rail;
  b) a guide block displaceable on the guide rail;
  c) a vertical guide, which is fastened to the guide block and connected to the service cage and which is fashioned in such a way that it allows vertical movements of the service cage.

This embodiment, therefore, by virtue of the horizontally extending guide rail has recourse to guide elements, which lie outside of the feed carriage itself and have to be provided along the path of motion of the feed carriage. The guide block displaceable on the guide rail participates in the horizontal component of motion of the service cage, while the vertical guide takes up the vertical component of motion of the service cage and ensures the vertical alignment of the service cage.

The vertical guide may be a telescopic guide, which grows longer or shorter upon the swivelling motion of the swivel arm and the upward and/or downward motion of the service cage associated therewith.

Alternatively, the vertical guide may simply comprise a guide rod, which extends through the guide block and is guided linearly therein.

Practically equivalent to this embodiment is the embodiment, in which the vertical guide comprises a guide rod, which extends through the element, which establishes the connection to the service cage, and is guided linearly therein.

Guide elements situated outside of the actual feed carriage are not required in the embodiment of the invention, in which the guide device comprises a connecting rod, which is coupled at the one end to the service cage and at the other end to a structure, which is rigidly connected to the running gear of the feed carriage, such that the connecting rod together with the swivel arm forms a parallelogram guide. Thus, if the swivel arm is swivelled with the aid of the drive associated therewith, then the parallelogram guide formed by the connecting rod ensures that the alignment of the service cage is maintained.

Yet another way of maintaining the orientation of the service cage is employed by the embodiment of the invention, in which a gear unit is provided, which in the mounted state of the service cage establishes a positive coupling between the swivelling motion of the swivel arm and the swivelling motion of the holding device carrying the service cage, such that the service cage upon a swivelling motion of the swivel arm remains vertically aligned. In this embodiment, first of all, the gear unit responsible for the normal, independent swivelling motion of the holding device about the free end of the swivel arm is totally or partially disassembled and replaced by another gear unit, which establishes a positive coupling to the drive that swivels the swivel arm. In this way too, the desired alignment of the service cage may be guaranteed in a purely mechanical and therefore extremely fail-safe manner.

Of a particularly simple mechanical design is the embodiment of the invention, in which the swivel arm is coupled to the region of the service cage lying above the center of gravity of the service cage and the service cage is suspended in pendulum fashion from the swivel arm. In this case, no special measures whatever are needed to guarantee the vertical alignment of the service cage because this vertical alignment arises automatically under the influence of gravitational force.

In this case, it is however recommended that damping or friction elements be provided for damping the reciprocating motion of the service cage.

Figure 2:
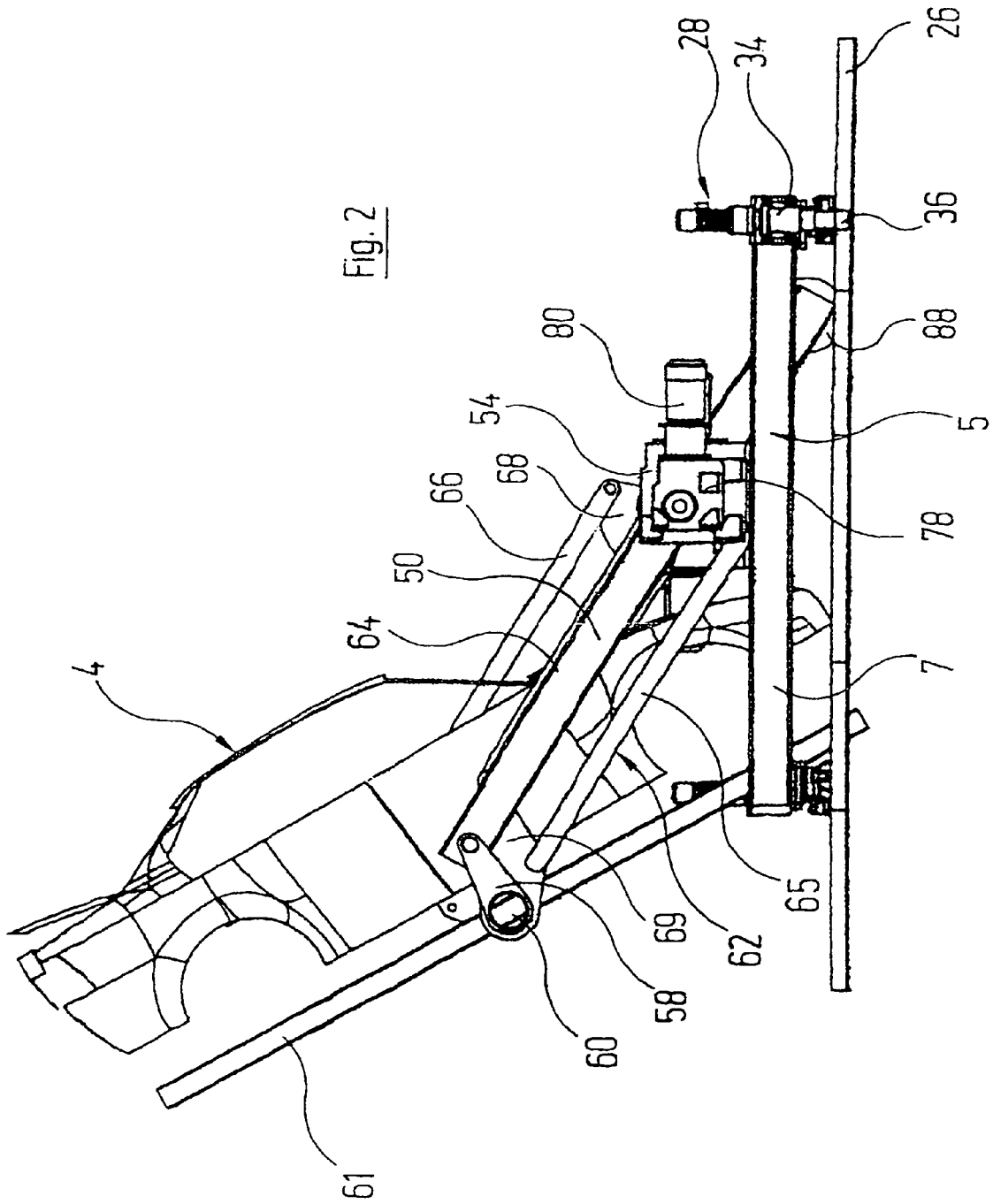
Figure 3:
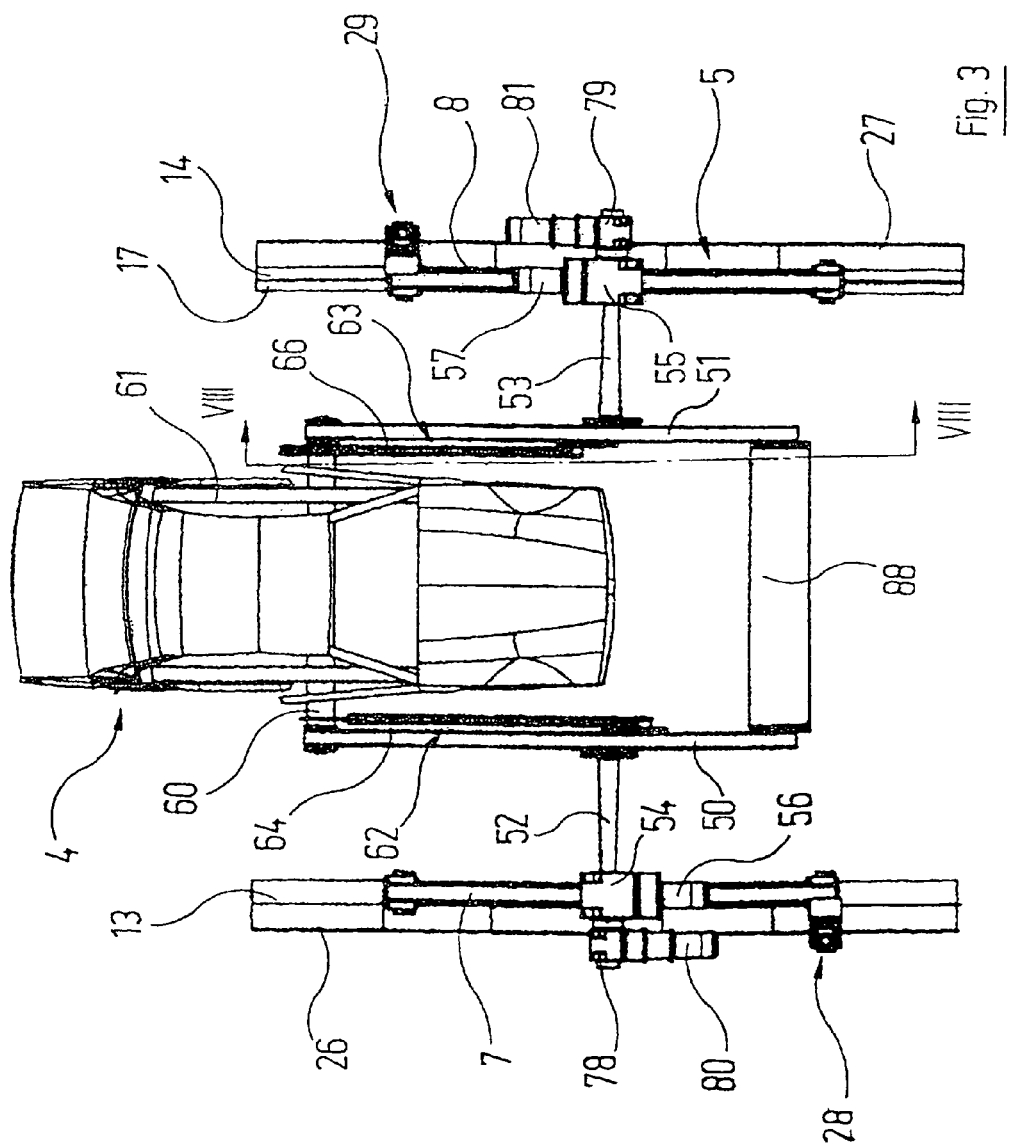
Figure 4:
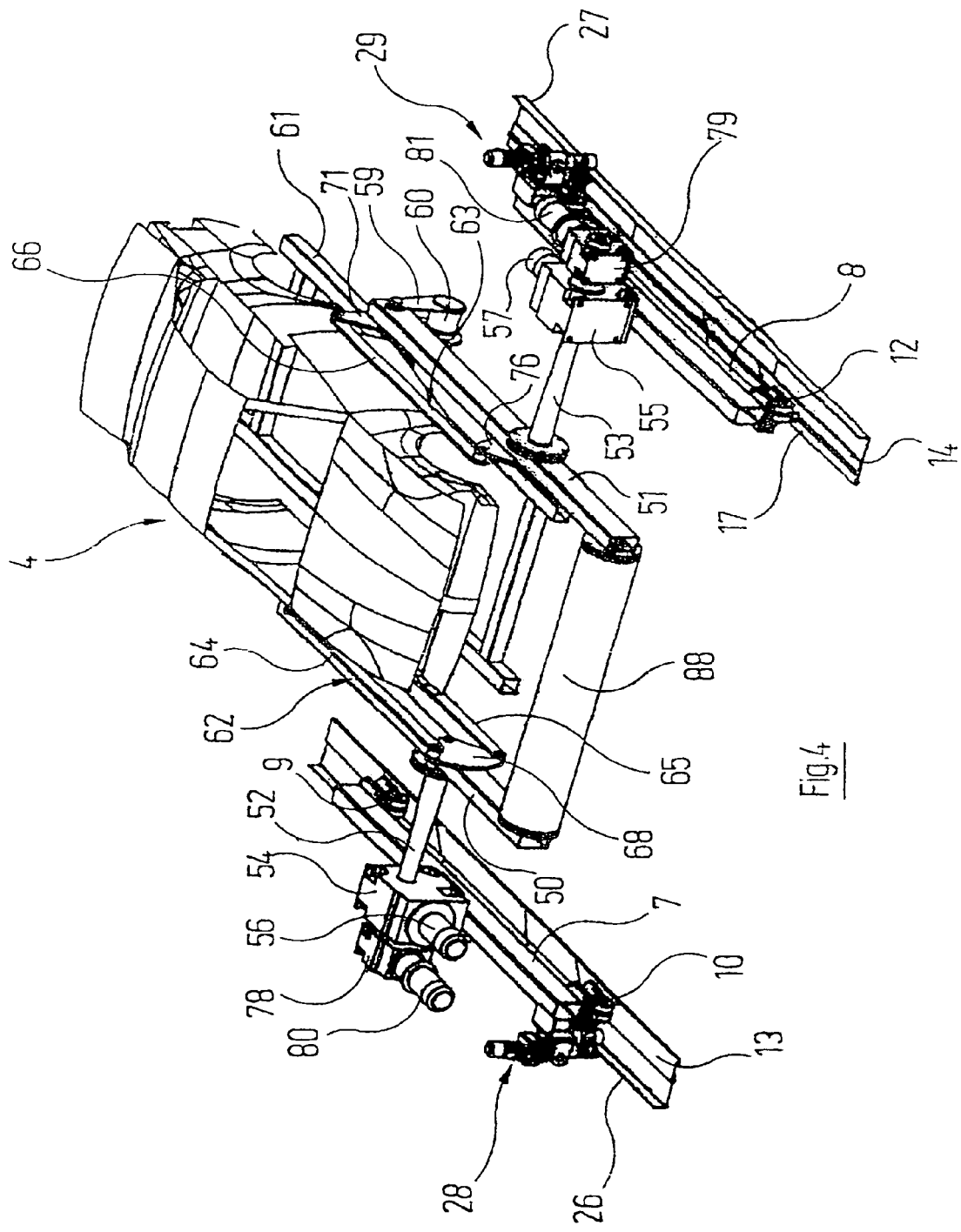
Figure 5:
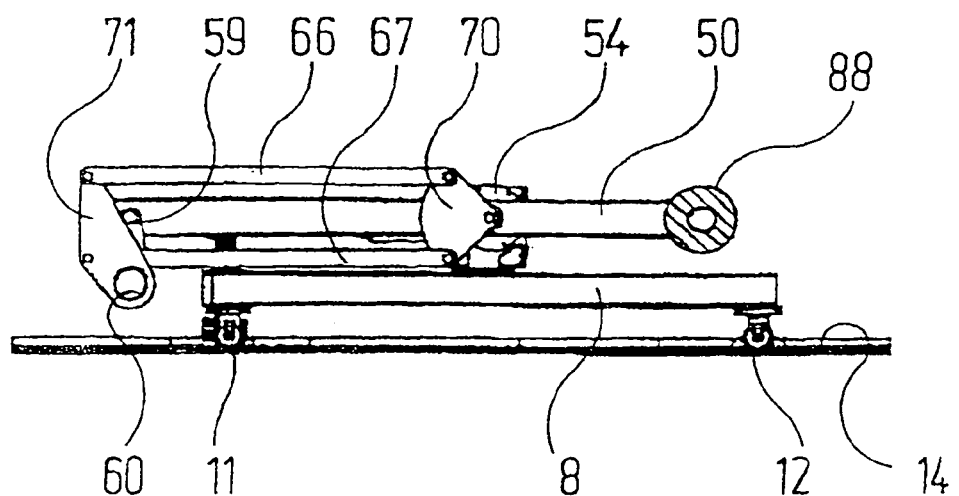
Figure 6:
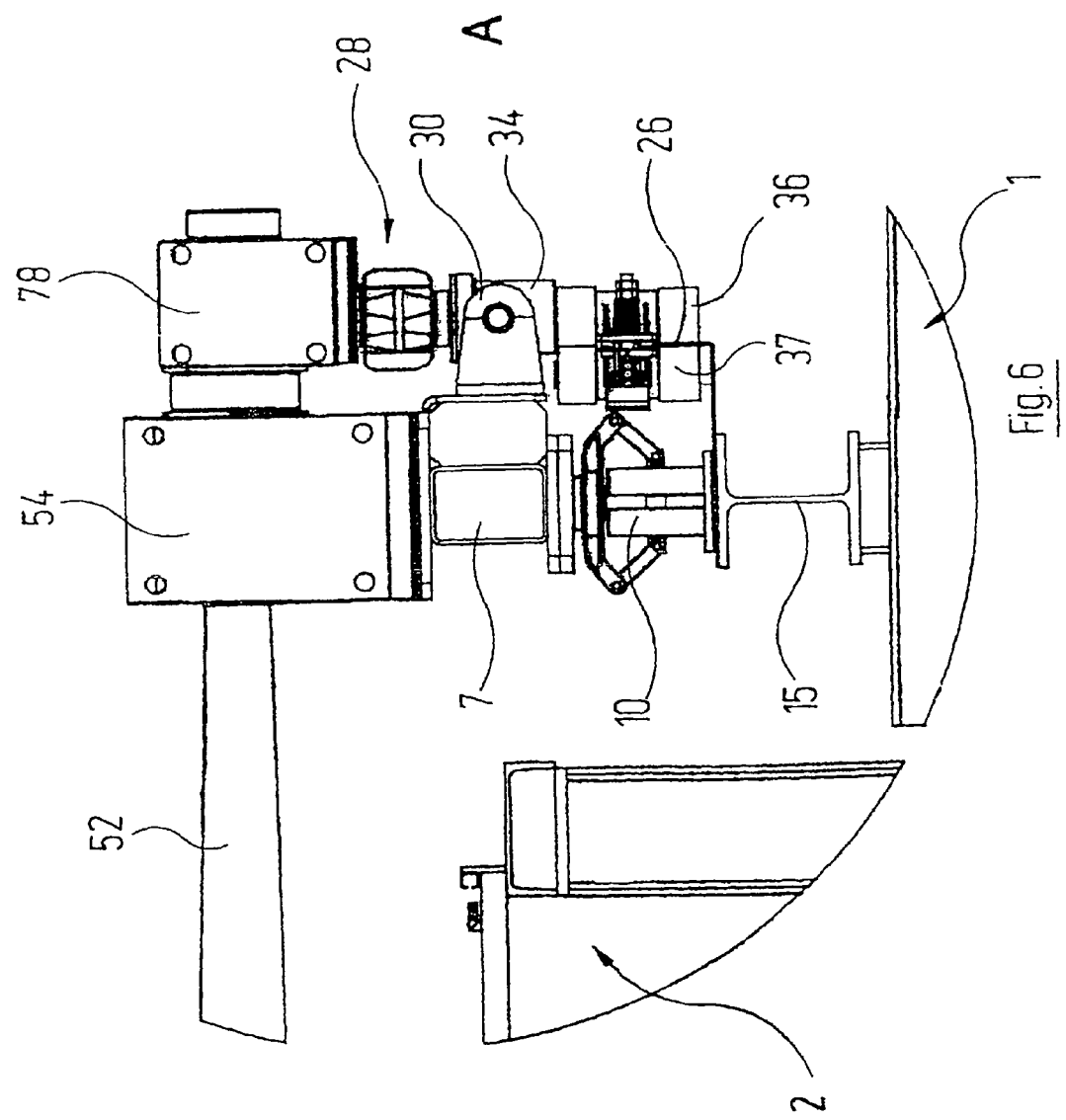
Figure 7:
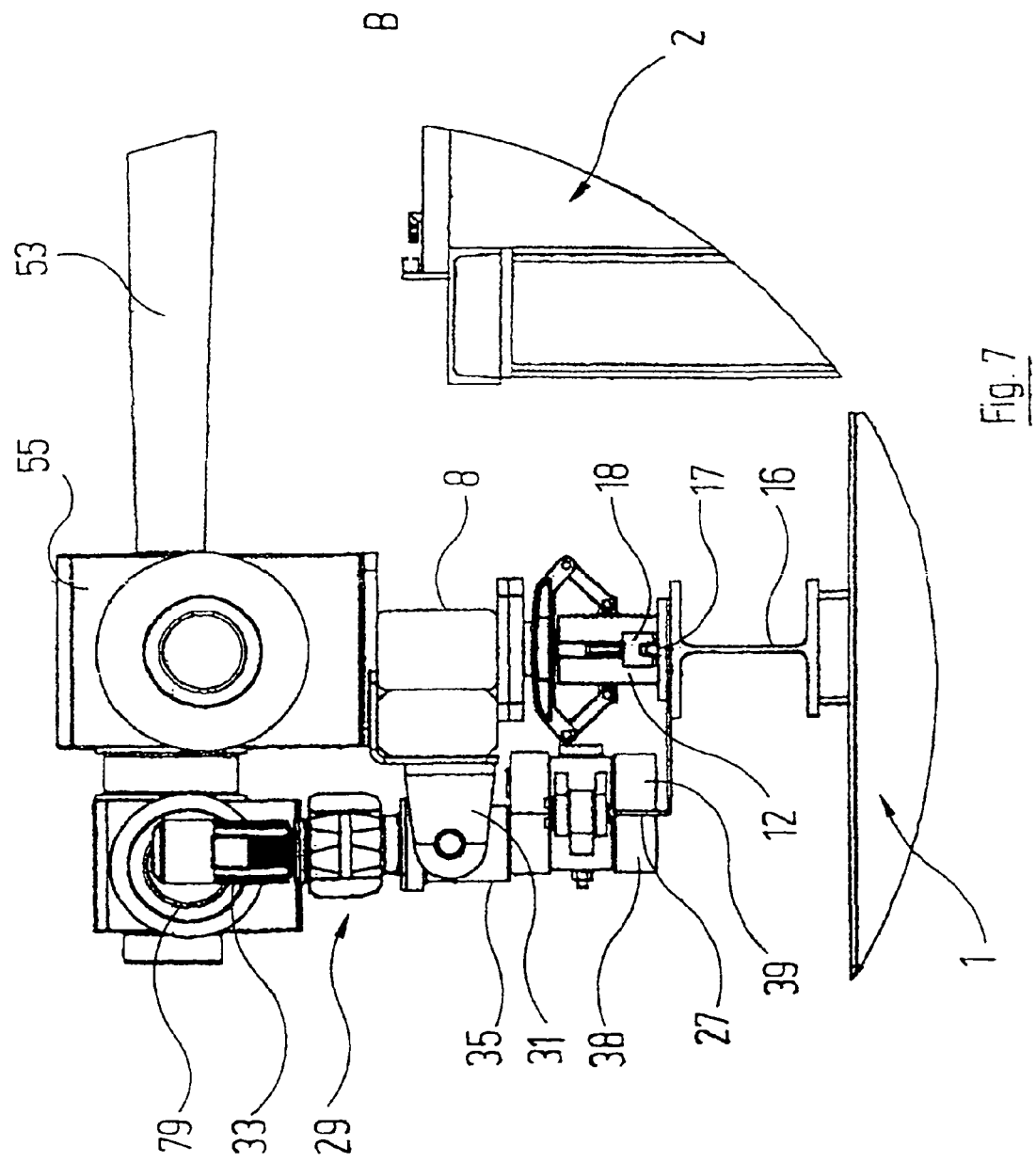
Figure 8:
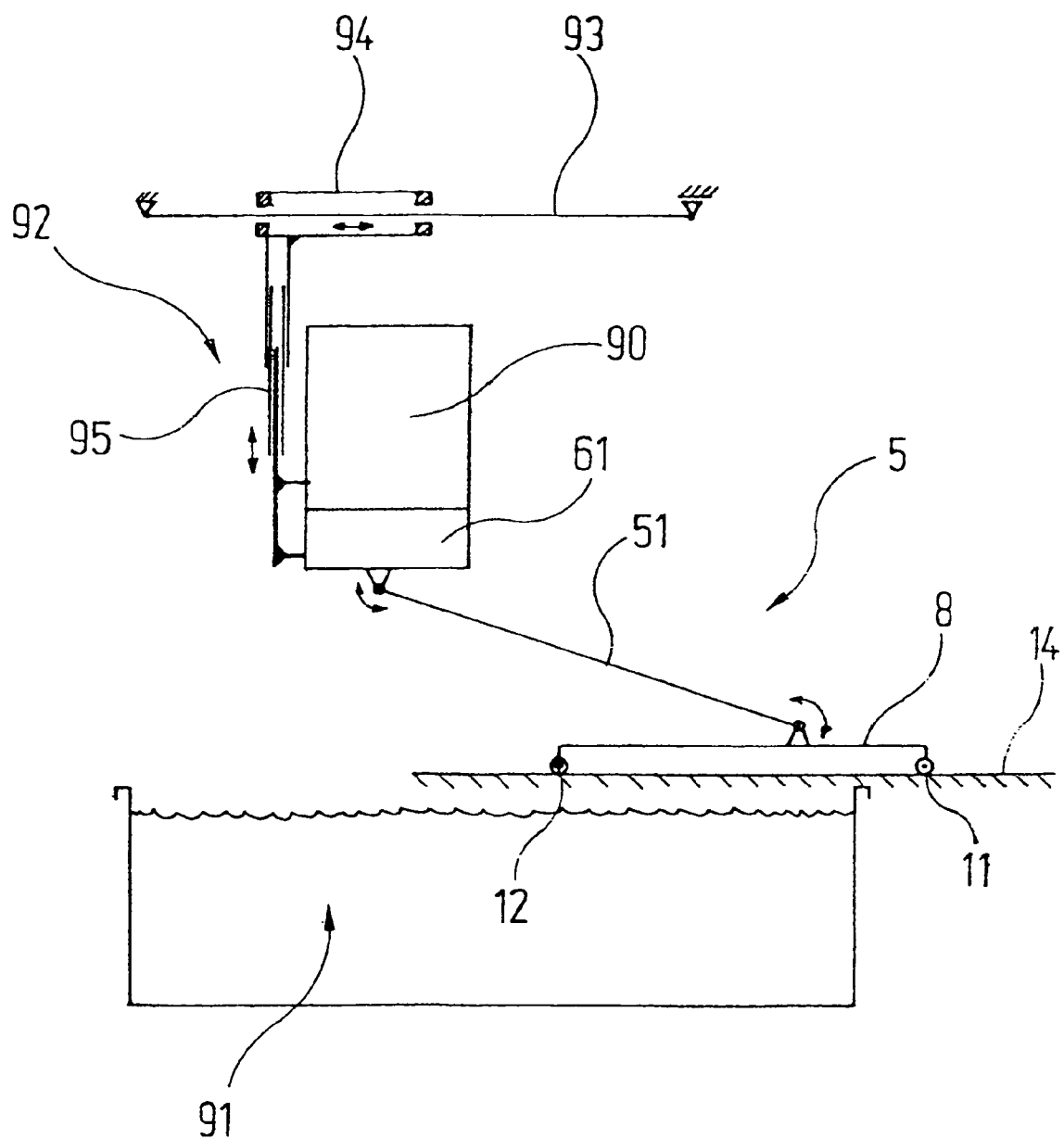
Figure 9:
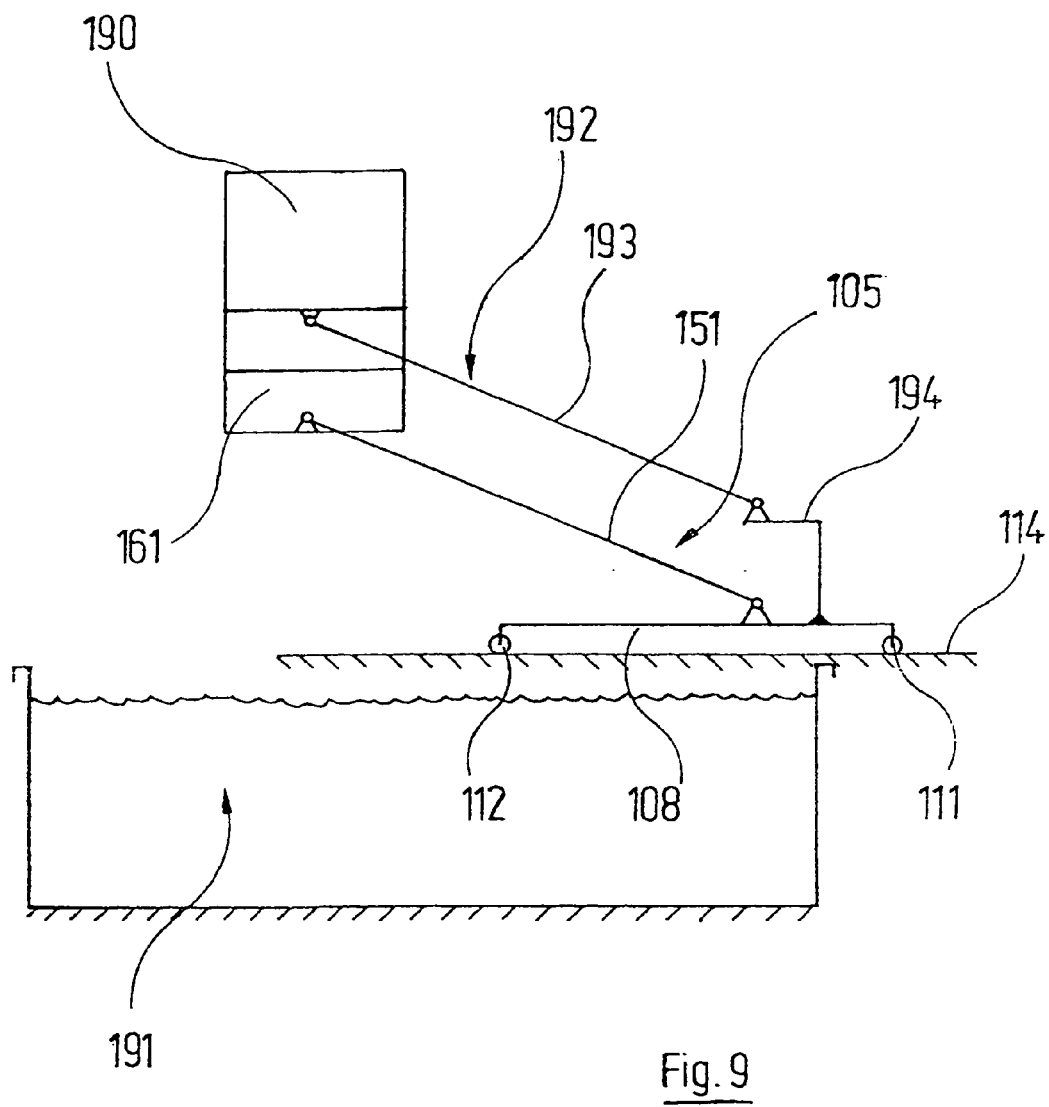

An embodiment of the invention is described in detail below with reference to the drawings; the drawings show FIG. 1: a side view of a feed carriage used in the coating system, with a vehicle body fastened thereon in normal feed position;

FIG. 2: a side view of the feed carriage similar to FIG. 1, in which however the vehicle body is swivelled out of the feed position;

FIG. 3: the plan view of the feed carriage of FIG. 2;

FIG. 4: a perspective view of the feed carriage plus vehicle body of FIG. 1;

FIG. 5: a section through FIG. 3 according to the line VIII-VIII of FIG. 3;

FIGS. 6 and 7: enlarged detail views of the feed carriage in the region of the wheels positioned on running surfaces;

FIG. 8: in a very diagrammatic manner a feed carriage above an immersion basin with a service cage, which is kept permanently vertically aligned by means of a first embodiment of a guide device;

FIG. 9: a view similar to FIG. 8, in which however a second embodiment of a guide device for the service cage is used.

First, there now follows a detailed description with reference to FIGS. 1 to 7 of the style of construction of feed carriages 5 of the type used in the coating system illustrated in the further drawings. Such feed carriages 5 are admittedly known in principle from DE-U-201 05 676, to which additionally reference is made. However, since a knowledge of the kinematics of these feed carriages 5 is a prerequisite to an understanding of the overall system, the explanation of the feed carriages 5 is repeated to the necessary extent in the present description.

As FIGS. 3 and 4 in particular reveal, each feed carriage 5 has two longitudinal tie-bars 7, 8, at the underside of each of which two twin wheels 9, 10 and 11, 12 are mounted rotatably about a horizontal axis. The wheels 9 to 12 are additionally rotatable in each case with the aid of a not specifically illustrated swivelling bolster about a vertical axis, with the result that the alignment of the twin wheels 9 to 12 relative to the respective longitudinal tie-bars 7, 8 may be varied.

The twin wheels 9, 10 roll along a first running surface 13 and the twin wheels 11, 12 roll along a second running surface 14 parallel to the first. The running surfaces 13, 14 are in turn mounted in each case on an I-beam 15, 16, which is supported by a non-illustrated steel structure.

In the middle of the, in FIGS. 3 and 4 right, second running surface 14 a guide rib 17 is provided, over which guide elements 18 having a complementary recess (cf. FIG. 7) engage. In each case one guide element 18 is connected to the swivelling bolster of an associated twin wheel 11 and/or 12 in such a way that it rotates this twin wheel 11 and/or 12 about the vertical axis in accordance with the course of the guide rib 17. The twin wheels 11, 12 therefore follow the running surface 14. The twin wheels 9, 10 associated with the first, in FIGS. 3 and 4 left running surface 13, on the other hand, are designed purely as trailing wheels; in other words, no separate guide means are provided for influencing the angular position of the wheels about their vertical axis of rotation. In this way, the standards of accuracy demanded of the guide means that hold the feed carriages 5 on the running surfaces 13, 14 may be kept low.

Vehicle bodies 4 are carried on the feed carriages 5 with the aid of an immersion apparatus, which comprises one swivelling apparatus on each side of the vehicle bodies 4. Each of these swivelling apparatuses has a swivel arm 50, 51, which in a manner yet to be described may swivel in a vertical plane extending parallel to the feed direction. For this purpose, each swivel arm 50, 51 is connected by a stub shaft 52, 53, which extends at right angles to the feed direction, to the output shaft of a gear unit 54, 55. The gear unit 54, 55 is fastened to the respective longitudinal tie-bar 7, 8 of the feed carriage 5 approximately in the central region thereof. It is driven by a motor 56 and/or 57, which is flange-mounted laterally on the gear unit 54, 55.

The, in direction of motion, rear ends of the swivel arms 50, 51 are hinge-connected to a link 58, 59, which in the normal feed position shown in FIG. 1 extends vertically downwards from the corresponding swivel arm 50, 51. The bottom ends of the links 58, 59 are connected to one another by a transverse tie-bar 60, which extends at right angles to the direction of motion and is in turn connected rigidly to the central region of a support platform 61 for the vehicle body 4. The direction of extension of the two links 58, 59 in said case runs at right angles to the plane of the support platform 61.

The angular position that the links 58, 59 occupy relative to the swivel arms 50, 51 is determined in each case by an adjusting device, which as a whole bears the reference character 62 and/or 63. Each of these adjusting devices 62, 63 comprises a linkage having two parallel push rods 64, 65 and/or 66, 67, which at their opposite ends are connected to one another in each case by a connecting strap 68, 69 and/or 70, 71. The, in direction of motion, rear connecting straps 69 and/or 71 are fastened at their bottom end rigidly to the transverse tie-rod 60.

The, in direction of motion, front connecting straps 70, 71, on the other hand, are connected rigidly in each case to a stub shaft, which is not visible in the drawings because it extends coaxially through the associated stub shaft 52, 53 designed as a hollow shaft. These further stub shafts extend also through the gear units 54, 55 and are coupled to the output shafts of further gear units 78, 79, which are fastened laterally to the gear units 54, 55. Drive motors 80, 81 are also flange-mounted laterally onto the gear units 78, 79.

The front ends of the two swivel arms 50, 51 jointly carry a counterweight 88, so that the torques acting upon the stub shafts 52, 53 are approximately counterbalanced when a vehicle body 4 is placed on.

The twin wheels 19 to 12 of the feed carriages 5 are not themselves driven. Rather, forward propulsion of the feed carriages 5 is effected by means of a separate drive, which is described in detail below with reference to FIGS. 3 to 7.

Extending parallel to the two running surfaces 13, 14 are two vertically aligned, stationary driving flanges 26, 27. These interact in each case with a press roller drive 28 and/or 29, which is fastened to the lateral surface of the adjacent longitudinal tie-bar 7, 8 by means of a link 30 and/or 31. The press roller drives 28, 29 each comprise an electric drive motor 32, 33 and a drive gear unit 34, 35. The latter drives the parallel, vertical axles of two press rollers 36, 37 and/or 38, 39, which are pressed from both sides against the respective associated driving flange 26 and/or 27. When the drive motors 32, 33 are energized, the press rollers 36, 37 and/or 38, 39 run along the respective lateral surfaces of the driving flanges 26, 27 and, in so doing, move the feed carriage 5 forward along the running surfaces 13, 14.

Each feed carriage 5 comprises its own carriage controller, under the regime of which it executes both its translational movement along the running surfaces 13, 14 and the swivelling motions of the swivel arms 50, 51 and of the support platform 61.

In summary, the movement options of a vehicle body 4 carried on a feed carriage 5 may be described as follows:

The overall movement arises from a superposition of the linear translational movement of the feed carriage 5, a first swivelling motion that the swivel arms 50, 51 execute relative to the longitudinal tie-bars 7, 8 and is linked to a lifting and/or lowering of the vehicle body 4, and a second swivelling motion that the vehicle body 4 situated on the support platform 61 executes relative to the swivel arms 50, 51. All of these types of movement may be carried out completely independently of one another, thereby leading to practically any desired kinematics of the vehicle body 4. In the previously described embodiment of a feed carriage 5, the swivelling motion is transmitted to the support platform 61 from the motors 80, 81 by means of linkage-like adjusting devices 62, 63. Naturally, the adjusting devices may however be designed differently, e.g. they may comprise continuous metal belts as torque-transmitting elements.

In FIG. 8 the feed carriage 5, which above with reference to FIGS. 1 to 7, is illustrated in an extremely diagrammatic manner in order to make the relationships clear. It is again possible to see in FIG. 8 the longitudinal tie-bar 8 with the twin wheels 11, 12 and the swivel arm 51, to the end of which the support platform 61 serving as a holding device is pivotably coupled. In FIG. 8, instead of a vehicle body 4 as in FIGS. 1 to 7, the support platform 61 carries a service cage 90, into which one or more persons may climb and from which these persons may carry out maintenance work.

The feed carriage 5 is movable along the running surfaces 13, 14, of which in FIG. 8 only the front running surface 14 is visible and which extend on either side of an immersion basin 91.

So that the service cage 90 always remains vertically aligned upon swivelling of the swivel arm 51, a guide device provided as a whole with the reference character 92 is provided. The guide device 92 comprises a horizontal guide rail 93, which is stationary, e.g. fastened to a steel structure, and along which a guide block 94 is guided in a horizontally displaceable manner. Fastened in turn to the guide block 94 is a vertically extending telescopic guide 95, which in turn is fastened to the support platform 61 and/or the service cage 90.

The guide device 92 operates as follows:

During mounting of the service cage 90 on the support platform 61, first the drive connection between the swivelling axis, about which the support platform 61 may swivel relative to the swivel arm 51, and the associated slewing-motion actuator is disconnected so that the support platform 61 may swivel freely about the said swivelling axis.

It is then assumed that the swivel arm 51, for lifting the service cage 90, is to be swivelled in FIG. 8 in clockwise direction. The vertical alignment of the service cage 90 is in said case maintained by means of the telescopic guide 95, which upon the upward motion of the service cage 90 grows shorter. At the same time, the service cage 90 experiences in FIG. 8 a component of motion to the right, which is accompanied by a corresponding linear displacement of the guide block 94 to the right along the guide rod 93.

If the service cage 90 is to be lowered, e.g. for immersion into the immersion bath 91, the described sequence of motion is effected in reverse direction: the swivel arm 51 swivels in FIG. 8 in an anticlockwise direction. The telescopic guide 95 grows longer upon the downward motion of the service cage 90. So long as the swivelling motion of the swivel arm 51 is linked with a horizontal component of motion of the service cage 90 to the left, the guide block 94 moves in a corresponding manner to the left along the guide rod 93.

It is apparent that in the described manner the service cage 90 may be brought with the aid of the feed carriage 5 into any desired position above but also inside the—in this case drained—immersion basin 91. From the service cage 90, the attendance personnel are therefore able to reach all of the articles and surfaces, in order, for example, to carry out maintenance or cleaning work. Once this work has been completed, the service cage 90 is removed from the support platform 61; the drive connection between the swivelling axis of the support platform 61 and the corresponding drive motor is re-established, so that "conventional" operation of the system may be resumed.

FIG. 9 shows an arrangement, which from a functional viewpoint substantially corresponds to the arrangement of FIG. 8. Matching parts are therefore characterized by the same reference characters plus 100. Once again, there is a feed carriage 105 situated on running surfaces 113, 114, along which it rolls by means of twin wheels 111, 112. The running surfaces 113, 114 extend parallel to an immersion bath 191. FIG. 9 further shows a swivel arm 151 of the feed carriage 105, which swivel arm is hinge-connected at its outer end to a support platform 161. On the support platform 161 a service cage 190 is mounted.

The service cage 190 is likewise kept in permanent vertical alignment by means of a guide device, which bears the reference character 192. In FIG. 9 this guide device 192 comprises at least one connecting rod 193, which extends parallel to the swivel arm 151 and is coupled at its outer end vertically above the swivel arm 151 to the service cage 190 and at its opposite end vertically above the swivel arm 151 to a structure 194 connected rigidly to the longitudinal tie-bars of the feed carriage 105 (in FIG. 9 only the longitudinal tie-bar 108 is visible). Thus, the connecting rod 193 together with the swivel arm 151 forms a parallelogram guide.

The described guide device 192 operates as follows:

Just as in the embodiment described in FIG. 8, when the service cage 190 is mounted on the support platform 161, the drive connection between the swivelling axis, which couples the support platform 161 to the swivel arms 151, and the associated slewing-motion actuator is interrupted, so that the support platform 161 may rotate freely relative to the swivel arm 151. When the swivel arm 151 is then swivelled in order to lift or lower the service cage 190, the connecting rod 193 permanently ensures the vertical alignment of the service cage 190.

It is evident that the service cage 190 of the embodiment illustrated in FIG. 9 may be used in the same way as the service cage 90 of the embodiment of FIG. 8 for maintenance and cleaning work in the entire region that is accessible to the service cage 190.

In a further embodiment, which is not illustrated in the drawings, the permanent vertical alignment of the service cage is effected, not by means of an external guide device, but by means of a gear unit, which connects the slewing-motion actuator for the swivel arm to the swivelling axis for rotation of the support platform in a transmission ratio that is the inverse of the transmission ratio, with which said actuator swivels the swivel arm itself. Naturally, in this embodiment too, the independent, normal drive connection between the swivelling axis of the support platform and the associated slewing-motion actuator is interrupted. The described positive coupling of the swivelling motion of the swivel arm and of the support platform clearly achieves the effect that the support platform remains permanently horizontal, the conveying cage therefore remains permanently vertically aligned.

Finally, it is also possible for the service cage to be fastened in a region lying above the center of gravity in an articulated manner to the swivel arm of the feed carriage such that it is suspended in pendulum fashion from the swivel arm and under the influence of gravitational force automatically finds the vertical alignment. An excessive reciprocating motion may in said case be suppressed by means of suitable friction or damping elements.

The invention claimed is:

1. A system for treating articles, comprising:
    a plurality of treatment stations, of which at least one station comprises a treatment container and at which the article undergoes a treatment;
    a feed device, by means of which the articles are conveyed through the various treatment stations and are in the process introduced into and removed from the at least one treatment container,
    the feed device comprising at least one feed carriage, which in turn comprising:
        running gear movable along the path of motion of the article;
        at least one swivel arm coupled to the running gear;
        a holding device coupled to the swivel arm for the article; and,
        mutually independently actuable drives for translational movement, swivelling motion of the at least one swivel arm and of the holding device;
    a service cage for carrying at least one person is fastenable to the holding device; and,
    a device is provided, by means of which the service cage upon the swivelling motion of the swivel arm is kept in vertical alignment.

2. System according to claim 1, wherein a drive connection between the holding device and the independent drive for the holding device is disconnectable.

3. System according to claim 2, wherein a mechanical guide device is provided, which keeps the service cage in vertical alignment.

4. System according to claim 3, wherein the mechanical guide device comprises:
    a rigidly fastened, horizontally extending guide rail;
    a guide block displaceable on the guide rail;
    a vertical guide, which is fastened to the guide block and connected to the service cage and fashioned in such a way that it allows vertical movements of the service cage.

5. System according to claim 4, wherein the vertical guide is a telescopic guide.

6. System according to claim 4, wherein the vertical guide comprises a guide rod, which extends through the guide block and is guided linearly therein.

7. System according to claim 4, wherein the vertical guide comprises a guide rod, which extends through an element, which establishes the connection to the service cage, and is guided linearly therein.

8. System according to claim 3, wherein the guide device comprises a connecting rod, which is coupled at one end to the service cage and at the other end to a structure, which is rigidly connected to the running gear, such that the connecting rod together with the swivel arm forms a parallelogram guide.

9. System according to claim 2, wherein a gear unit is provided, which in the mounted state of the service cage establishes a positive coupling between the swivelling motion of the swivel arm and the swivelling motion of the holding device carrying the service cage, such that the service cage upon the swivelling motion of the swivel arm remains vertically aligned.

10. System according to claim 2, wherein the swivel arm is coupled to the region of the service cage lying above the center of gravity of the service cage and the service cage is suspended in pendulum fashion from the swivel arm.

11. System according to claim 10, wherein damping or friction elements are provided for damping the reciprocating motion of the service cage.

* * * * *